United States Patent
Callaway

(10) Patent No.: US 11,001,763 B2
(45) Date of Patent: May 11, 2021

(54) MIXED METAL OXIDE SORBENT COMPOSITION AND METHOD FOR REMOVING ORGANOSULFUR FROM LIQUID HYDROCARBON STREAMS

(71) Applicant: H2SZERO, LLC, Sapulpa, OK (US)

(72) Inventor: Michael Callaway, Sapulpa, OK (US)

(73) Assignee: H2SZERO, LLC, Sapulpa, OK (US)

( * ) Notice: Subject to any disclaimer, the term of this patent is extended or adjusted under 35 U.S.C. 154(b) by 0 days.

(21) Appl. No.: 16/339,913

(22) PCT Filed: Oct. 6, 2017

(86) PCT No.: PCT/US2017/055624
§ 371 (c)(1),
(2) Date: Apr. 5, 2019

(87) PCT Pub. No.: WO2018/067990
PCT Pub. Date: Apr. 12, 2018

(65) Prior Publication Data
US 2020/0048562 A1 Feb. 13, 2020

Related U.S. Application Data

(60) Provisional application No. 62/404,800, filed on Oct. 6, 2016.

(51) Int. Cl.
| | |
|---|---|
| *B01J 20/06* | (2006.01) |
| *C10G 25/00* | (2006.01) |
| *B01J 20/28* | (2006.01) |
| *B82Y 30/00* | (2011.01) |
| *B82Y 40/00* | (2011.01) |

(52) U.S. Cl.
CPC ............ *C10G 25/003* (2013.01); *B01J 20/06* (2013.01); *B01J 20/28007* (2013.01); *B01J 20/28057* (2013.01); *B82Y 30/00* (2013.01); *B82Y 40/00* (2013.01); *C10G 2300/202* (2013.01)

(58) Field of Classification Search
None
See application file for complete search history.

(56) References Cited

U.S. PATENT DOCUMENTS

| | | |
|---|---|---|
| 4,344,842 A | 8/1982 | Fox |
| 8,404,031 B1 | 3/2013 | Callaway |
| 8,759,252 B1 | 6/2014 | Callaway |
| 2007/0131589 A1 | 6/2007 | Weston et al. |
| 2013/0126394 A1 | 5/2013 | Cheng |
| 2013/0216833 A1 | 8/2013 | Logli et al. |
| 2016/0130144 A1* | 5/2016 | Tairova .................. C01B 19/02 423/510 |

* cited by examiner

*Primary Examiner* — Tam M Nguyen
(74) *Attorney, Agent, or Firm* — GableGotwals

(57) ABSTRACT

Embodiments of an organosulfur capture or scavenger nanomaterial of this disclosure include a sorbent containing a composition of a mixed metal oxide, the metal being in various oxidation states. In embodiments, the mixed metal is manganese, iron, nickel, copper, or zinc. In some embodiments the sorbent includes a first mixed metal oxide and a second different metal or mixed metal oxide. The scavenger material may be synthesized from a metal precursor salt, neutralized and dried, and then washed or soaked to remove one or more byproducts. The resulting sorbent is in nanoparticulate form and has an amorphous non-crystalline structure.

9 Claims, No Drawings

MIXED METAL OXIDE SORBENT COMPOSITION AND METHOD FOR REMOVING ORGANOSULFUR FROM LIQUID HYDROCARBON STREAMS

CROSS-REFERENCE TO RELATED APPLICATIONS

This United States application is the National Phase of PCT Application No. PCT/US2017/055624 filed 6 Oct. 2017, which claims priority to U.S. Provisional Patent Application No. 62/404,800 filed 6 Oct. 2016, each of which is incorporated herein by reference.

BACKGROUND

This disclosure is in the field of processes designed to remove sulfides, mercaptans, and thiophenes from liquid hydrocarbon process streams such as, but not limited to, natural gas liquids, propane, butane, ethylene, diesel, bio-diesel, and gasoline.

Iron oxide-based and iron carbonate-based adsorbents having a defined crystalline structure like SULFATREAT-HC® and SULFURTRAP® can be used to treat liquid hydrocarbon streams and remove hydrogen sulfide and light sulfur compounds like methyl and ethyl mercaptans. However, their sulfur-removing performance, as measured in the gas environment, is limited relative to iron oxide-based adsorbents having at least some amorphous structure like that disclosed in U.S. Pat. No. 8,404,031 B1 and U.S. Pat. No. 8,759,252 B1 to Callaway. In the liquids environment, the crystalline iron oxide-based and iron carbonate-based adsorbents have not proven themselves to be cost-effective alternatives to precious metal catalysts in treating liquid hydrocarbon streams.

The amorphous-content iron-based adsorbents have not been tried in liquids given that field experience teaches that iron-based adsorbents will not be cost effective in treating these liquids due, in part, to the iron-based adsorbents relatively low organosulfur loading capacity. This capacity is typically below 10% and usually around 5% or less.

SUMMARY

Embodiments of an organosulfur capture or scavenger nanomaterial of this disclosure include a sorbent containing a composition of a mixed metal oxide, the metal being in various oxidation states. In embodiments, the metal is manganese, iron, nickel, copper, or zinc in two or more oxidized states. In other embodiments the sorbent includes a first mixed metal oxide and a second different metal or mixed metal oxide.

The organosulfur scavenger nanomaterial may be synthesized from a metal precursor salt, neutralized and dried, and then washed or soaked to remove one or more byproducts. The resulting sorbent is in nanoparticulate form and has a characteristic structure different than that of the constituent metal oxide, hydroxide, and oxyhydroxide crystalline structures. In embodiments, the characteristic structure is amorphous, having no definable crystalline structure.

Embodiments of the organosulfur scavenger nanomaterial may be used to remove the following organosulfur from a liquid hydrocarbon stream:
 light end sulfurs—carbonyl sulfide, hydrogen sulfide, carbon disulfide, dimethyl sulfide, dimethyl disulfide, and sulfur dioxide;
 mercaptans—methyl mercaptan, ethyl mercaptan, isopropyl mercaptan, ethyl methyl sulfide, iso-butyl mercaptan, diethyl sulfide, sec-butyl mercaptan, tert-butyl mercaptan, pentyl and heavier mercpatans; and
 thiophenes—2-methylthiophene, 3-methylthiophene, thiophene, benzothiophenes, methlybenzothiophenes.

The liquid hydrocarbon stream may be treated at ambient or process temperatures and at pressures greater than the vapor pressure of the liquid hydrocarbon stream being treated.

DESCRIPTION OF THE PREFERRED EMBODIMENTS

Embodiments of an organosulfur capture or scavenger nanomaterial of this disclosure include a sorbent containing a composition of a mixed metal oxide, the metal being in various oxidation states. In embodiments, the metal of the mixed metal oxide is manganese, iron, nickel, copper, or zinc in two or more oxidized states. In other embodiments the sorbent includes a first metal oxide and a second different metal or mixed metal oxide. The first and second different metals may be manganese, iron, nickel, copper, or zinc in at least two oxidation states.

The organosulfur scavenger nanomaterial may be synthesized from a metal precursor salt, neutralized and dried, and then washed or soaked to remove one or more byproducts. The resulting sorbent is in nanoparticulate form and has a characteristic structure different than that of the constituent metal oxide, hydroxide, and oxyhydroxide crystalline structures. In embodiments, the characteristic structure is amorphous, having no definable crystalline structure. The same is true of embodiments in which the sorbent includes a first and a second different metal oxide.

During synthesis, the material may be in an intermediate form or final form after drying. The intermediate or final forms may be any shape preferable, including but not limited to briquetted, extrudate, granular, pellet, or spherical. In some embodiments, the scavenger material is washed or soaked and then dried.

Embodiments of the organosulfur scavenger nanomaterial can be made using ferric or ferrous chloride salts neutralized with a base such as calcium hydroxide or its equivalent, formed in intermediate or final form and dried, and then washed or soaked to remove one or more byproducts such as salts. A modified version of an iron oxide-based marketed under (H2S)ZERO® scavenger was made using this method and proved to be a suitable scavenger for removing organosulfur from a liquid hydrocarbon stream.

In one embodiment, the metal is iron and the mixed metal oxide includes ferrous and ferric oxide, ferrous and ferric hydroxide, and ferric oxyhydroxide. In some embodiments, the ferric content is greater than the ferrous content. In other embodiments, the ferrous content is greater than the ferric content. In yet other embodiments, the hydroxide content is greater than the oxide content, oxyhydroxide content, or the total oxide and oxyhydroxide content. The mixed iron oxide may include just two oxidation states.

In some embodiments, the metal is manganese and the mixed metal oxide includes manganese oxides, manganese hydroxides, and manganese oxyhydroxides. In other embodiments, the metal is nickel and the mixed metal oxide includes nickel oxide, nickel hydroxide, and nickel oxyhydroxide. In yet other embodiments, the metal is copper and the mixed metal oxide includes copper oxides and copper hydroxide or includes zinc oxide and zinc hydroxide. Similar to the iron-based composition, these other compositions may have one form of the metal greater than another form or a greater content of one oxidation state than another oxidation state.

In embodiments, ferrous chloride is used as the precursor salt to make the scavenger material. In other embodiments, ferric chloride may be used as the precursor salt. The ferric chloride-produced scavenger material is harder, more dense, and more water-resistant than the ferrous-chloride embodiments. The ferrous chloride-produced embodiments, while more amenable to regeneration, tend to be softer, less dense, and less water-resistant. However, the ferrous chloride embodiments are more amenable to regeneration than the ferric chloride embodiments.

Regardless of whether ferric- or ferrous chloride precursor salt is used, the resulting organosulfur scavenger nanomaterial has an amorphous non-crystalline structure. Ferrous and ferric oxide, hydroxide, and oxyhydroxide crystalline structures may be present in combination with the amorphous non-crystalline structure.

The content of the organosulfur scavenger nanomaterial may be measured using means known in the art such as but not limited to X-ray diffraction analysis or energy dispersive X-ray analysis. In some embodiments, the material includes one or more metals different than that of metal of the mixed metal oxide. For example, a mixed iron oxide embodiment may include manganese, nickel, copper, zinc, or some combination thereof. Similarly, a mixed manganese metal oxide may include iron, nickel, copper, zinc, or some combination thereof. These other metals may be found in trace amounts upwards to 5% wgt., 10% wgt., or 15% wgt.

In some embodiments, the mixed metal oxide in various oxidation states and forming this amorphous non-crystalline structure of the material is in a range of 10% wgt. to 80% wgt. In other embodiments, the amorphous constituent is in a range of 10% wgt. to 20% wgt., 20% wgt. to 30% wgt., 30% wgt. to 40% wgt., 40% wgt. to 50% wgt, 50% wgt. to 60% wgt., 60% wgt. to 70% wgt., or 70% wgt. to 80% wgt. In yet other embodiments, the amorphous constituent includes two or more of the amorphous constituent sub-ranges listed here, there being sub-subranges as well.

The particle size of the scavenger material is less than 1,000 nm. In some embodiments, the particle size is less than 500 nm. In other embodiments, the particle size is less than 100 nm or less than 50 nm. In yet other embodiments, the particle size is less than 25 nm or 15 nm. The particle size may be in a range of 10 nm to 20 nm, 20 nm to 30 nm, 30 nm to 40 nm, 40 nm to 50 nm, 50 nm to 60 nm, 70 nm to 80 nm, 80 nm to 90 nm, 90 nm to 100 nm, 100 nm to 200 nm, 200 nm to 300 nm, 300 nm to 400 nm, 400 nm to 500 nm. In yet other embodiments, the particle size includes two or more of the particle size sub-ranges listed here, there being sub-subranges as well.

The surface area may be in a range of 50 $m^2/g$ to 500 $m^2/g$. In some embodiments, the average surface area is in a range of 50 $m^2/g$ to 100 $m^2/g$, 100 $m^2/g$ to 150 $m^2/g$, 150 $m^2/g$ to 200 $m^2/g$, 200 $m^2/g$ to 250 $m^2/g$, 250 $m^2/g$ to 300 $m^2/g$, 300 $m^2/g$ to 350 $m^2/g$, 350 $m^2/g$ to 400 $m^2/g$, 400 $m^2/g$ to 450 $m^2/g$, or 450 $m^2/g$ to 500 $m^2/g$. In yet other embodiments, the average surface area includes two or more of the surface area sub-ranges listed here, there being sub-subranges as well.

An embodiment of a method for removing organosulfur such as sulfide, mercaptans, and thiophenes from a liquid hydrocarbon stream includes passing the liquid hydrocarbon stream through a vessel, sorption tower, or bed containing the scavenger material. The material may be in any form preferable. In some embodiments, the porosity of the material in the loaded bed is in a range of 40% to 60% (meaning, for example, that a vessel having 100% of its total volume filled with the scavenger material may also contain 50% of its volume in water). In other embodiments, the porosity of the material is in a range of 45% to 55%.

The method may be run at pressures above the vapor pressure of the liquid hydrocarbon stream being treated. The method may also be run at ambient temperatures or process condition temperatures. In embodiments, the temperature is above 32° F. (0° C.) and no greater than 800° F. (426° C.), there being sub-ranges within this overall range. In other embodiments, the temperature is less than 100° F. (38° C.). In yet other embodiments, the temperature is in a range of 60° F. to 80° F. (16° C. to 27° C.).

In tests of the method, the method provides a faster reaction rate, greater uptake capacity, and longer run life than comparable iron oxide-based and iron carbonate-based scavenger methods. The method may be used to remove sulfides, mercaptans, and thiophenes from liquid hydrocarbon process streams such as, but not limited to, natural gas liquids, propane, butane, ethylene, diesel, biodiesel, and gasoline.

Tables 1 to 7 present test results using embodiments of the scavenger material containing a mixed iron oxide in various oxidation states. The treater used was 1-inch (2.54 cm) in diameter and 8 inches (203 mm) in length, holding about 100 grams of the scavenger material with a 4:1 L/D length over width bed height. The testing was performed at a pressure of 100 psig delivered to the treater bed. The treater temperature was 70° F. (21° C.). The sample was passed over a bed containing the scavenger material at a flowrate of 1,000 cc/minute, as measured at the outlet of the treater during testing (at 14.73 psia). The inlet gas composition to the test treater contained 64.13 ppmv total mercaptans.

The organosulfur scavenger nanomaterial removed 100% of the mercaptans. The mercaptan content of the outlet flow was no greater than 0.010 ppm (0.039 mg/m³, 0.001 grains). By the end of the 24-hour test period, the treater was still removing all of the mercaptans, with a small amount of other by-product sulfurs.

TABLE 1

Composition of inlet gas feed.

CALIBRATION GAS USED AS GAS FEED TO TEST TREATER

| | | | |
|---|---|---|---|
| SAMPLE LOCATION | CASPER, WYOMING | COUNTY | NATRONA |
| SAMPLE PRESSURE | 1,000 PSIG | SAMPLE TEMP | 70 F. |
| METHOD OF ANALYSIS | SCD CHROMATOGRAPHY | SAMPLE METHOD | DIRECT INJECTION |
| TEST METHOD | ASTM D-5504 | CONTAINER | N/A |
| INSTRUMENTATION | SIEVERS MODEL 355 SULFUR | | |

TABLE 1-continued

Composition of inlet gas feed.

CHEMILUMINESCENCE DETECTOR.

|  | RESULTS PPM/VOLUME | RESULTS Mg/M3 | RESULTS GRAINS/100SCF |
|---|---|---|---|
| LIGHT END COMPONENTS |  |  |  |
| CARBONYL SULFIDE (COS) | <0.010 PPMV | <0.025 Mg/M3 | <0.001 GRAINS |
| HYDROGEN SULFIDE (H2S) | <0.010 PPMV | <0.014 Mg/M3 | <0.001 GRAINS |
| CARBON DISULFIDE (CS2) | <0.010 PPMV | <0.031 Mg/M3 | <0.001 GRAINS |
| DIMETHYL SULFIDE (CH3)2S) | <0.010 PPMV | <0.025 Mg/M3 | <0.001 GRAINS |
| DIMETHYL DISULFIDE (CH3)2S2) | <0.010 PPMV | <0.039 Mg/M3 | <0.001 GRAINS |
| SULFUR DIOXIDE (SO2) | <0.010 PPMV | <0.031 Mg/M3 | <0.001 GRAINS |
| TOTAL LIGHT END SULFURS | <0.010 PPM | <0.039 Mg/M3 | <0.001 GRAINS |
| MERCAPTANS & THIOPHENES |  |  |  |
| METHYL MERCAPTAN | 10.730 PPMV | 21.138 Mg/M3 | 0.695 GRAINS |
| ETHYL MERCAPTAN | 10.280 PPMV | 26.111 Mg/M3 | 0.666 GRAINS |
| iso-PROPYL MERCAPTAN | 10.830 PPMV | 33.681 Mg/M3 | 0.702 GRAINS |
| n-PROPYL MERCAPTAN | 10.410 PPMV | 32.375 Mg/M3 | 0.675 GRAINS |
| ETHYL METHYL SULFIDE | <0.010 PPMV | <0.031 Mg/M3 | <0.001 GRAINS |
| iso-BUTYL MERCAPTAN | 10.950 PPMV | 40.406 Mg/M3 | 0.710 GRAINS |
| n-BUTYL MERCAPTAN | 10.930 PPMV | 40.332 Mg/M3 | 0.708 GRAINS |
| DIETHYL SULFIDE | <0.010 PPMV | <0.037 Mg/M3 | <0.001 GRAINS |
| sec-BUTYL MERCAPTAN | <0.010 PPMV | <0.037 Mg/M3 | <0.001 GRAINS |
| tert-BUTYL MERCAPTAN | <0.010 PPMV | <0.026 Mg/M3 | <0.001 GRAINS |
| PENTYL AND HEAVIER MERCAPTANS | <0.010 PPMV | <0.039 Mg/M3 | <0.001 GRAINS |
| 2-METHYLTHIOPHENE | <0.010 PPMV | <0.034 Mg/M3 | <0.001 GRAINS |
| 3-METHYLTHIOPHENE | <0.010 PPMV | <0.034 Mg/M3 | <0.001 GRAINS |
| THIOPHENE | <0.010 PPMV | <0.034 Mg/M3 | <0.001 GRAINS |
| TOTAL BENZOTHIOPHENES | <0.010 PPMV | <0.039 Mg/M3 | <0.001 GRAINS |
| TOTAL METHYLBENZOTHIOPHENES | <0.010 PPMV | <0.039 Mg/M3 | <0.001 GRAINS |
| TOTAL MERCAPTANS & THIOPHENES | 64.130 PPMV | 194.043 Mg/M3 | 4.156 GRAINS |
| TOTAL ALL SULFURS | 64.130 PPMV | 194.043 Mg/M3 | 4.156 GRAINS |

ALL COMPONENTS ANALYZED AS PPM/VOLUME, THEN CONVERTED TO MILLIGRAMS PER CUBIC METER USING FACTORS OUTLINED IN ASTM D-5504.

TABLE 2

Composition of outlet gas taken 5 minutes after flow started.

| SAMPLE IDENTIFICATION | OUTLET GAS TO TEST TREATER TAKEN 5 MINUTES AFTER FLOW STARTED CALIBRATION GAS USED AS GAS FEED TO TEST TREATER |  |  |
|---|---|---|---|
| SAMPLE LOCATION | CASPER, WYOMING | COUNTY | NATRONA |
| SAMPLE PRESSURE | 100 PSIG | SAMPLE TEMP | 70 F. |
| METHOD OF ANALYSIS | SCD CHROMATOGRAPHY | SAMPLE METHOD | DIRECT INJECTION |
| TEST METHOD | ASTM D-5504 | CONTAINER | N/A |
| INSTRUMENTATION | SIEVERS MODEL 355 SULFUR CHEMILUMINESCENCE DETECTOR. |  |  |

|  | RESULTS PPM/VOLUME | RESULTS Mg/M3 | RESULTS GRAINS/100SCF |
|---|---|---|---|
| LIGHT END COMPONENTS |  |  |  |
| CARBONYL SULFIDE (COS) | <0.010 PPMV | <0.025 Mg/M3 | <0.001 GRAINS |
| HYDROGEN SULFIDE (H2S) | <0.010 PPMV | <0.014 Mg/M3 | <0.001 GRAINS |
| CARBON DISULFIDE (CS2) | <0.010 PPMV | <0.031 Mg/M3 | <0.001 GRAINS |
| DIMETHYL SULFIDE (CH3)2S) | <0.010 PPMV | <0.025 Mg/M3 | <0.001 GRAINS |
| DIMETHYL DISULFIDE (CH3)2S2) | <0.010 PPMV | <0.039 Mg/M3 | <0.001 GRAINS |
| SULFUR DIOXIDE (SO2) | <0.010 PPMV | <0.031 Mg/M3 | <0.001 GRAINS |
| TOTAL LIGHT END SULFURS | <0.010 PPM | <0.039 Mg/M3 | <0.001 GRAINS |
| MERCAPTANS & THIOPHENES |  |  |  |
| METHYL MERCAPTAN | <0.010 PPMV | <0.020 Mg/M3 | <0.001 GRAINS |
| ETHYL MERCAPTAN | <0.010 PPMV | <0.025 Mg/M3 | <0.001 GRAINS |
| iso-PROPYL MERCAPTAN | <0.010 PPMV | <0.031 Mg/M3 | <0.001 GRAINS |
| n-PROPYL MERCAPTAN | <0.010 PPMV | <0.031 Mg/M3 | <0.001 GRAINS |
| ETHYL METHYL SULFIDE | <0.010 PPMV | <0.031 Mg/M3 | <0.001 GRAINS |
| iso-BUTYL MERCAPTAN | <0.010 PPMV | <0.037 Mg/M3 | <0.001 GRAINS |
| n-BUTYL MERCAPTAN | <0.010 PPMV | <0.037 Mg/M3 | <0.001 GRAINS |
| DIETHYL SULFIDE | <0.010 PPMV | <0.037 Mg/M3 | <0.001 GRAINS |
| sec-BUTYL MERCAPTAN | <0.010 PPMV | <0.037 Mg/M3 | <0.001 GRAINS |
| tert-BUTYL MERCAPTAN | <0.010 PPMV | <0.026 Mg/M3 | <0.001 GRAINS |

TABLE 2-continued

Composition of outlet gas taken 5 minutes after flow started.

| | | | |
|---|---|---|---|
| PENTYL AND HEAVIER MERCAPTANS | <0.010 PPMV | <0.039 Mg/M3 | <0.001 GRAINS |
| 2-METHYLTHIOPHENE | <0.010 PPMV | <0.034 Mg/M3 | <0.001 GRAINS |
| 3-METHYLTHIOPHENE | <0.010 PPMV | <0.034 Mg/M3 | <0.001 GRAINS |
| THIOPHENE | <0.010 PPMV | <0.034 Mg/M3 | <0.001 GRAINS |
| TOTAL BENZOTHIOPHENES | <0.010 PPMV | <0.039 Mg/M3 | <0.001 GRAINS |
| TOTAL METHYLBENZOTHIOPHENES | <0.010 PPMV | <0.039 Mg/M3 | <0.001 GRAINS |
| TOTAL MERCAPTANS & THIOPHENES | <0.010 PPMV | <0.039 Mg/M3 | <0.001 GRAINS |
| TOTAL ALL SULFURS | <0.010 PPMV | <0.039 Mg/M3 | <0.001 GRAINS |

ALL COMPONENTS ANALYZED AS PPM/VOLUME, THEN CONVERTED TO MILLIGRAMS PER CUBIC METER USING FACTORS OUTLINED IN ASTM D-5504.

TABLE 3

Composition of outlet gas taken 2 hours after flow started.

| | | | |
|---|---|---|---|
| SAMPLE IDENTIFICATION | OUTLET GAS TO TEST TREATER TAKEN 2 HOURS AFTER FLOW STARTED CALIBRATION GAS USED AS GAS FEED TO TEST TREATER | | |
| SAMPLE LOCATION | CASPER, WYOMING | COUNTY | NATRONA |
| SAMPLE PRESSURE | 100 PSIG | SAMPLE TEMP | 70 F. |
| METHOD OF ANALYSIS | SCD CHROMATOGRAPHY | SAMPLE METHOD | DIRECT INJECTION |
| TEST METHOD | ASTM D-5504 | CONTAINER | N/A |
| INSTRUMENTATION | SIEVERS MODEL 355 SULFUR CHEMILUMINESCENCE DETECTOR. | | |

| | RESULTS PPM/VOLUME | RESULTS Mg/M3 | RESULTS GRAINS/100SCF |
|---|---|---|---|
| LIGHT END COMPONENTS | | | |
| CARBONYL SULFIDE (COS) | <0.010 PPMV | <0.025 Mg/M3 | <0.001 GRAINS |
| HYDROGEN SULFIDE (H2S) | <0.010 PPMV | <0.014 Mg/M3 | <0.001 GRAINS |
| CARBON DISULFIDE (CS2) | <0.010 PPMV | <0.031 Mg/M3 | <0.001 GRAINS |
| DIMETHYL SULFIDE (CH3)2S | <0.010 PPMV | <0.025 Mg/M3 | <0.001 GRAINS |
| DIMETHYL DISULFIDE (CH3)2S2 | <0.010 PPMV | <0.039 Mg/M3 | <0.001 GRAINS |
| SULFUR DIOXIDE (SO2) | <0.010 PPMV | <0.031 Mg/M3 | <0.001 GRAINS |
| TOTAL LIGHT END SULFURS | <0.010 PPM | <0.039 Mg/M3 | <0.001 GRAINS |
| MERCAPTANS & THIOPHENES | | | |
| METHYL MERCAPTAN | <0.010 PPMV | <0.020 Mg/M3 | <0.001 GRAINS |
| ETHYL MERCAPTAN | <0.010 PPMV | <0.025 Mg/M3 | <0.001 GRAINS |
| iso-PROPYL MERCAPTAN | <0.010 PPMV | <0.031 Mg/M3 | <0.001 GRAINS |
| n-PROPYL MERCAPTAN | <0.010 PPMV | <0.031 Mg/M3 | <0.001 GRAINS |
| ETHYL METHYL SULFIDE | <0.010 PPMV | <0.031 Mg/M3 | <0.001 GRAINS |
| iso-BUTYL MERCAPTAN | <0.010 PPMV | <0.037 Mg/M3 | <0.001 GRAINS |
| n-BUTYL MERCAPTAN | <0.010 PPMV | <0.037 Mg/M3 | <0.001 GRAINS |
| DIETHYL SULFIDE | <0.010 PPMV | <0.037 Mg/M3 | <0.001 GRAINS |
| sec-BUTYL MERCAPTAN | <0.010 PPMV | <0.037 Mg/M3 | <0.001 GRAINS |
| tert-BUTYL MERCAPTAN | <0.010 PPMV | <0.026 Mg/M3 | <0.001 GRAINS |
| PENTYL AND HEAVIER MERCAPTANS | <0.010 PPMV | <0.039 Mg/M3 | <0.001 GRAINS |
| 2-METHYLTHIOPHENE | <0.010 PPMV | <0.034 Mg/M3 | <0.001 GRAINS |
| 3-METHYLTHIOPHENE | <0.010 PPMV | <0.034 Mg/M3 | <0.001 GRAINS |
| THIOPHENE | <0.010 PPMV | <0.034 Mg/M3 | <0.001 GRAINS |
| TOTAL BENZOTHIOPHENES | <0.010 PPMV | <0.039 Mg/M3 | <0.001 GRAINS |
| TOTAL METHYLBENZOTHIOPHENES | <0.010 PPMV | <0.039 Mg/M3 | <0.001 GRAINS |
| TOTAL MERCAPTANS & THIOPHENES | <0.010 PPMV | <0.039 Mg/M3 | <0.001 GRAINS |
| TOTAL ALL SULFURS | <0.010 PPMV | <0.039 Mg/M3 | <0.001 GRAINS |

ALL COMPONENTS ANALYZED AS PPM/VOLUME, THEN CONVERTED TO MILLIGRAMS PER CUBIC METER USING FACTORS OUTLINED IN ASTM D-5504.

TABLE 4

Composition of outlet gas taken 4 hours after flow started.

| | | | |
|---|---|---|---|
| SAMPLE IDENTIFICATION | OUTLET GAS TO TEST TREATER TAKEN 4 HOURS AFTER FLOW STARTED CALIBRATION GAS USED AS GAS FEED TO TEST TREATER | | |
| SAMPLE LOCATION | CASPER, WYOMING | COUNTY | NATRONA |
| SAMPLE PRESSURE | 100 PSIG | SAMPLE TEMP | 70 F. |
| METHOD OF ANALYSIS | SCD CHROMATOGRAPHY | SAMPLE METHOD | DIRECT INJECTION |
| TEST METHOD | ASTM D-5504 | CONTAINER | N/A |
| INSTRUMENTATION | SIEVERS MODEL 355 SULFUR | | |

TABLE 4-continued

Composition of outlet gas taken 4 hours after flow started.

CHEMILUMINESCENCE DETECTOR.

| | RESULTS PPM/VOLUME | RESULTS Mg/M3 | RESULTS GRAINS/100SCF |
|---|---|---|---|
| LIGHT END COMPONENTS | | | |
| CARBONYL SULFIDE (COS) | <0.010 PPMV | <0.025 Mg/M3 | <0.001 GRAINS |
| HYDROGEN SULFIDE (H2S) | <0.010 PPMV | <0.014 Mg/M3 | <0.001 GRAINS |
| CARBON DISULFIDE (CS2) | <0.010 PPMV | <0.031 Mg/M3 | <0.001 GRAINS |
| DIMETHYL SULFIDE (CH3)2S) | <0.010 PPMV | <0.025 Mg/M3 | <0.001 GRAINS |
| DIMETHYL DISULFIDE (CH3)2S2) | <0.010 PPMV | <0.039 Mg/M3 | <0.001 GRAINS |
| SULFUR DIOXIDE (SO2) | <0.010 PPMV | <0.031 Mg/M3 | <0.001 GRAINS |
| TOTAL LIGHT END SULFURS | <0.010 PPM | <0.039 Mg/M3 | <0.001 GRAINS |
| MERCAPTANS & THIOPHENES | | | |
| METHYL MERCAPTAN | <0.010 PPMV | <0.020 Mg/M3 | <0.001 GRAINS |
| ETHYL MERCAPTAN | <0.010 PPMV | <0.025 Mg/M3 | <0.001 GRAINS |
| iso-PROPYL MERCAPTAN | <0.010 PPMV | <0.031 Mg/M3 | <0.001 GRAINS |
| n-PROPYL MERCAPTAN | <0.010 PPMV | <0.031 Mg/M3 | <0.001 GRAINS |
| ETHYL METHYL SULFIDE | <0.010 PPMV | <0.031 Mg/M3 | <0.001 GRAINS |
| iso-BUTYL MERCAPTAN | <0.010 PPMV | <0.037 Mg/M3 | <0.001 GRAINS |
| n-BUTYL MERCAPTAN | <0.010 PPMV | <0.037 Mg/M3 | <0.001 GRAINS |
| DIETHYL SULFIDE | <0.010 PPMV | <0.037 Mg/M3 | <0.001 GRAINS |
| sec-BUTYL MERCAPTAN | <0.010 PPMV | <0.037 Mg/M3 | <0.001 GRAINS |
| tert-BUTYL MERCAPTAN | <0.010 PPMV | <0.026 Mg/M3 | <0.001 GRAINS |
| PENTYL AND HEAVIER MERCAPTANS | <0.010 PPMV | <0.039 Mg/M3 | <0.001 GRAINS |
| 2-METHYLTHIOPHENE | <0.010 PPMV | <0.034 Mg/M3 | <0.001 GRAINS |
| 3-METHYLTHIOPHENE | <0.010 PPMV | <0.034 Mg/M3 | <0.001 GRAINS |
| THIOPHENE | <0.010 PPMV | <0.034 Mg/M3 | <0.001 GRAINS |
| TOTAL BENZOTHIOPHENES | <0.010 PPMV | <0.039 Mg/M3 | <0.001 GRAINS |
| TOTAL METHYLBENZOTHIOPHENES | <0.010 PPMV | <0.039 Mg/M3 | <0.001 GRAINS |
| TOTAL MERCAPTANS & THIOPHENES | <0.010 PPMV | <0.039 Mg/M3 | <0.001 GRAINS |
| TOTAL ALL SULFURS | <0.010 PPMV | <0.039 Mg/M3 | <0.001 GRAINS |

ALL COMPONENTS ANALYZED AS PPM/VOLUME, THEN CONVERTED TO MILLIGRAMS PER CUBIC METER USING FACTORS OUTLINED IN ASTM D-5504.

TABLE 5

Composition of outlet gas taken 6 hours after flow started

| SAMPLE IDENTIFICATION | OUTLET GAS TO TEST TREATER TAKEN 6 HOURS AFTER FLOW STARTED CALIBRATION GAS USED AS GAS FEED TO TEST TREATER | | |
|---|---|---|---|
| SAMPLE LOCATION | CASPER, WYOMING | COUNTY | NATRONA |
| SAMPLE PRESSURE | 100 PSIG | SAMPLE TEMP | 70 F. |
| METHOD OF ANALYSIS | SCD CHROMATOGRAPHY | SAMPLE METHOD | DIRECT INJECTION |
| TEST METHOD | ASTM D-5504 | CONTAINER | N/A |
| INSTRUMENTATION | SIEVERS MODEL 355 SULFUR CHEMILUMINESCENCE DETECTOR. | | |

| | RESULTS PPM/VOLUME | RESULTS Mg/M3 | RESULTS GRAINS/100SCF |
|---|---|---|---|
| LIGHT END COMPONENTS | | | |
| CARBONYL SULFIDE (COS) | <0.010 PPMV | <0.025 Mg/M3 | <0.001 GRAINS |
| HYDROGEN SULFIDE (H2S) | <0.010 PPMV | <0.014 Mg/M3 | <0.001 GRAINS |
| CARBON DISULFIDE (CS2) | <0.010 PPMV | <0.031 Mg/M3 | <0.001 GRAINS |
| DIMETHYL SULFIDE (CH3)2S) | <0.010 PPMV | <0.025 Mg/M3 | <0.001 GRAINS |
| DIMETHYL DISULFIDE (CH3)2S2) | 0.020 PPMV | 0.077 Mg/M3 | 0.001 GRAINS |
| SULFUR DIOXIDE (SO2) | <0.010 PPMV | <0.031 Mg/M3 | <0.001 GRAINS |
| TOTAL LIGHT END SULFURS | 0.020 PPM | 0.077 Mg/M3 | 0.001 GRAINS |
| MERCAPTANS & THIOPHENES | | | |
| METHYL MERCAPTAN | <0.010 PPMV | <0.020 Mg/M3 | <0.001 GRAINS |
| ETHYL MERCAPTAN | <0.010 PPMV | <0.025 Mg/M3 | <0.001 GRAINS |
| iso-PROPYL MERCAPTAN | <0.010 PPMV | <0.031 Mg/M3 | <0.001 GRAINS |
| n-PROPYL MERCAPTAN | <0.010 PPMV | <0.031 Mg/M3 | <0.001 GRAINS |
| ETHYL METHYL SULFIDE | <0.010 PPMV | <0.031 Mg/M3 | <0.001 GRAINS |
| iso-BUTYL MERCAPTAN | <0.010 PPMV | <0.037 Mg/M3 | <0.001 GRAINS |
| n-BUTYL MERCAPTAN | <0.010 PPMV | <0.037 Mg/M3 | <0.001 GRAINS |
| DIETHYL SULFIDE | <0.010 PPMV | <0.037 Mg/M3 | <0.001 GRAINS |
| sec-BUTYL MERCAPTAN | <0.010 PPMV | <0.037 Mg/M3 | <0.001 GRAINS |
| tert-BUTYL MERCAPTAN | <0.010 PPMV | <0.026 Mg/M3 | <0.001 GRAINS |

TABLE 5-continued

Composition of outlet gas taken 6 hours after flow started

| | | | |
|---|---|---|---|
| PENTYL AND HEAVIER MERCAPTANS | <0.010 PPMV | <0.039 Mg/M3 | <0.001 GRAINS |
| 2-METHYLTHIOPHENE | <0.010 PPMV | <0.034 Mg/M3 | <0.001 GRAINS |
| 3-METHYLTHIOPHENE | <0.010 PPMV | <0.034 Mg/M3 | <0.001 GRAINS |
| THIOPHENE | <0.010 PPMV | <0.034 Mg/M3 | <0.001 GRAINS |
| TOTAL BENZOTHIOPHENES | <0.010 PPMV | <0.039 Mg/M3 | <0.001 GRAINS |
| TOTAL METHYLBENZOTHIOPHENES | <0.010 PPMV | <0.039 Mg/M3 | <0.001 GRAINS |
| TOTAL MERCAPTANS & THIOPHENES | <0.010 PPMV | <0.039 Mg/M3 | <0.001 GRAINS |
| TOTAL ALL SULFURS | 0.020 PPMV | 0.077 Mg/M3 | 0.001 GRAINS |

ALL COMPONENTS ANALYZED AS PPM/VOLUME, THEN CONVERTED TO MILLIGRAMS PER CUBIC METER USING FACTORS OUTLINED IN ASTM D-5504.

TABLE 6

Composition of outlet gas taken 20 hours after flow started

| | | | |
|---|---|---|---|
| SAMPLE IDENTIFICATION | OUTLET GAS TO TEST TREATER TAKEN 20 HOURS AFTER FLOW STARTED CALIBRATION GAS USED AS GAS FEED TO TEST TREATER | | |
| SAMPLE LOCATION | CASPER, WYOMING | COUNTY | NATRONA |
| SAMPLE PRESSURE | 100 PSIG | SAMPLE TEMP | 70 F. |
| METHOD OF ANALYSIS | SCD CHROMATOGRAPHY | SAMPLE METHOD | DIRECT INJECTION |
| TEST METHOD | ASTM D-5504 | CONTAINER | N/A |
| INSTRUMENTATION | SIEVERS MODEL 355 SULFUR CHEMILUMINESCENCE DETECTOR. | | |

| | RESULTS PPM/VOLUME | RESULTS Mg/M3 | RESULTS GRAINS/100SCF |
|---|---|---|---|
| LIGHT END COMPONENTS | | | |
| CARBONYL SULFIDE (COS) | <0.010 PPMV | <0.025 Mg/M3 | <0.001 GRAINS |
| HYDROGEN SULFIDE (H2S) | <0.010 PPMV | <0.014 Mg/M3 | <0.001 GRAINS |
| CARBON DISULFIDE (CS2) | <0.010 PPMV | <0.031 Mg/M3 | <0.001 GRAINS |
| DIMETHYL SULFIDE (CH3)2S) | <0.010 PPMV | <0.025 Mg/M3 | <0.001 GRAINS |
| DIMETHYL DISULFIDE (CH3)2S2) | 1.785 PPMV | 6.872 Mg/M3 | 0.116 GRAINS |
| SULFUR DIOXIDE (SO2) | <0.010 PPMV | <0.031 Mg/M3 | <0.001 GRAINS |
| TOTAL LIGHT END SULFURS | 1.785 PPM | 6.872 Mg/M3 | 0.116 GRAINS |
| MERCAPTANS & THIOPHENES | | | |
| METHYL MERCAPTAN | <0.010 PPMV | <0.020 Mg/M3 | <0.001 GRAINS |
| ETHYL MERCAPTAN | <0.010 PPMV | <0.025 Mg/M3 | <0.001 GRAINS |
| iso-PROPYL MERCAPTAN | <0.010 PPMV | <0.031 Mg/M3 | <0.001 GRAINS |
| n-PROPYL MERCAPTAN | <0.010 PPMV | <0.031 Mg/M3 | <0.001 GRAINS |
| ETHYL METHYL SULFIDE | <0.010 PPMV | <0.031 Mg/M3 | <0.001 GRAINS |
| iso-BUTYL MERCAPTAN | <0.010 PPMV | <0.037 Mg/M3 | <0.001 GRAINS |
| n-BUTYL MERCAPTAN | <0.010 PPMV | <0.037 Mg/M3 | <0.001 GRAINS |
| DIETHYL SULFIDE | 0.492 PPMV | 1.815 Mg/M3 | 0.032 GRAINS |
| sec-BUTYL MERCAPTAN | <0.010 PPMV | <0.037 Mg/M3 | <0.001 GRAINS |
| tert-BUTYL MERCAPTAN | <0.010 PPMV | <0.026 Mg/M3 | <0.001 GRAINS |
| PENTYL AND HEAVIER MERCAPTANS | <0.010 PPMV | <0.039 Mg/M3 | <0.001 GRAINS |
| 2-METHYLTHIOPHENE | <0.010 PPMV | <0.034 Mg/M3 | <0.001 GRAINS |
| 3-METHYLTHIOPHENE | <0.010 PPMV | <0.034 Mg/M3 | <0.001 GRAINS |
| THIOPHENE | <0.010 PPMV | <0.034 Mg/M3 | <0.001 GRAINS |
| TOTAL BENZOTHIOPHENES | <0.010 PPMV | <0.039 Mg/M3 | <0.001 GRAINS |
| TOTAL METHYLBENZOTHIOPHENES | <0.010 PPMV | <0.039 Mg/M3 | <0.001 GRAINS |
| TOTAL MERCAPTANS & THIOPHENES | 0.492 PPMV | 1.815 Mg/M3 | 0.032 GRAINS |
| TOTAL ALL SULFURS | 2.277 PPMV | 8.688 Mg/M3 | 0.148 GRAINS |

ALL COMPONENTS ANALYZED AS PPM/VOLUME, THEN CONVERTED TO MILLIGRAMS PER CUBIC METER USING FACTORS OUTLINED IN ASTM D-5504.

TABLE 7

Composition of outlet gas taken 24 hours after flow started

| | | | |
|---|---|---|---|
| SAMPLE IDENTIFICATION | OUTLET GAS TO TEST TREATER TAKEN 24 HOURS AFTER FLOW STARTED CALIBRATION GAS USED AS GAS FEED TO TEST TREATER | | |
| SAMPLE LOCATION | CASPER, WYOMING | COUNTY | NATRONA |
| SAMPLE PRESSURE | 100 PSIG | SAMPLE TEMP | 70 F. |
| METHOD OF ANALYSIS | SCD CHROMATOGRAPHY | SAMPLE METHOD | DIRECT INJECTION |
| TEST METHOD | ASTM D-5504 | CONTAINER | N/A |
| INSTRUMENTATION | SIEVERS MODEL 355 SULFUR | | |

TABLE 7-continued

Composition of outlet gas taken 24 hours after flow started

CHEMILUMINESCENCE DETECTOR.

| | RESULTS PPM/VOLUME | RESULTS Mg/M3 | RESULTS GRAINS/100SCF |
|---|---|---|---|
| LIGHT END COMPONENTS | | | |
| CARBONYL SULFIDE (COS) | <0.010 PPMV | <0.025 Mg/M3 | <0.001 GRAINS |
| HYDROGEN SULFIDE (H2S) | <0.010 PPMV | <0.014 Mg/M3 | <0.001 GRAINS |
| CARBON DISULFIDE (CS2) | <0.010 PPMV | <0.031 Mg/M3 | <0.001 GRAINS |
| DIMETHYL SULFIDE (CH3)2S) | <0.010 PPMV | <0.025 Mg/M3 | <0.001 GRAINS |
| DIMETHYL DISULFIDE (CH3)2S2) | 1.200 PPMV | 4.620 Mg/M3 | 0.078 GRAINS |
| SULFUR DIOXIDE (SO2) | <0.010 PPMV | <0.031 Mg/M3 | <0.001 GRAINS |
| TOTAL LIGHT END SULFURS | 1.200 PPM | 4.620 Mg/M3 | 0.078 GRAINS |
| MERCAPTANS & THIOPHENES | | | |
| METHYL MERCAPTAN | <0.010 PPMV | <0.020 Mg/M3 | <0.001 GRAINS |
| ETHYL MERCAPTAN | <0.010 PPMV | <0.025 Mg/M3 | <0.001 GRAINS |
| iso-PROPYL MERCAPTAN | <0.010 PPMV | <0.031 Mg/M3 | <0.001 GRAINS |
| n-PROPYL MERCAPTAN | <0.010 PPMV | <0.031 Mg/M3 | <0.001 GRAINS |
| ETHYL METHYL SULFIDE | <0.010 PPMV | <0.031 Mg/M3 | <0.001 GRAINS |
| iso-BUTYL MERCAPTAN | <0.010 PPMV | <0.037 Mg/M3 | <0.001 GRAINS |
| n-BUTYL MERCAPTAN | <0.010 PPMV | <0.037 Mg/M3 | <0.001 GRAINS |
| DIETHYL SULFIDE | 1.544 PPMV | 5.697 Mg/M3 | 0.100 GRAINS |
| sec-BUTYL MERCAPTAN | <0.010 PPMV | <0.037 Mg/M3 | <0.001 GRAINS |
| tert-BUTYL MERCAPTAN | <0.010 PPMV | <0.026 Mg/M3 | <0.001 GRAINS |
| PENTYL AND HEAVIER MERCAPTANS | <0.010 PPMV | <0.039 Mg/M3 | <0.001 GRAINS |
| 2-METHYLTHIOPHENE | <0.010 PPMV | <0.034 Mg/M3 | <0.001 GRAINS |
| 3-METHYLTHIOPHENE | <0.010 PPMV | <0.034 Mg/M3 | <0.001 GRAINS |
| THIOPHENE | <0.010 PPMV | <0.034 Mg/M3 | <0.001 GRAINS |
| TOTAL BENZOTHIOPHENES | <0.010 PPMV | <0.039 Mg/M3 | <0.001 GRAINS |
| TOTAL METHYLBENZOTHIOPHENES | <0.010 PPMV | <0.039 Mg/M3 | <0.001 GRAINS |
| TOTAL MERCAPTANS & THIOPHENES | 1.544 PPMV | 5.697 Mg/M3 | 0.100 GRAINS |
| TOTAL ALL SULFURS | 2.744 PPMV | 10.317 Mg/M3 | 0.178 GRAINS |

ALL COMPONENTS ANALYZED AS PPM/VOLUME, THEN CONVERTED TO MILLIGRAMS PER CUBIC METER USING FACTORS OUTLINED IN ASTM D-5504.

A field trial of embodiments of the organosulfur scavenger nanomaterial was conducted to treat a liquid propane stream containing organosulfur. The liquid propane stream entered a treatment skid containing the material at ambient temperature and a process pressure sufficient to maintain the liquid form of the propane stream. The scavenger material exhibited a mercaptans loading capacity in a range of 10% wgt. to 20% wgt. The total sulfur loading capacity was in a range of 40% wgt. to 50% wgt.

Embodiments of the organosulfur scavenger nanomaterial may be used to effectively treat a liquid hydrocarbon stream containing one or more of the following:
light end sulfurs—carbonyl sulfide, hydrogen sulfide, carbon disulfide, dimethyl sulfide, dimethyl disulfide, and sulfur dioxide;
mercaptans—methyl mercaptan, ethyl mercaptan, iso-propyl mercaptan, ethyl methyl sulfide, iso-butyl mercaptan, diethyl sulfide, sec-butyl mercaptan, tert-butyl mercaptan, pentyl and heavier mercpatans; and
thiophenes—2-methylthiophene, 3-methylthiophene, thiophene, benzothiophenes, methlybenzothiophenes.

The liquid hydrocarbon stream may be treated at ambient or process temperatures and at pressures greater than the vapor pressure of the liquid hydrocarbon stream being treated.

What is claimed:
1. A method for removing organosulfur from a liquid hydrocarbon stream, the method comprising:
passing a liquid hydrocarbon process stream through a vessel containing a non-magnetic mixed metal oxide, hydroxide, and oxyhydroxide sorbent nanomaterial;
the non-magnetic mixed metal oxide, hydroxide, and oxyhydroxide sorbent nanomaterial including an amorphous non-crystalline structure and containing a metal in at least two oxidation states;
the liquid hydrocarbon process stream having a first organosulfur content when entering the vessel and a second lower organosulfur content when exiting the vessel.

2. A method according to claim 1 wherein the non-magnetic mixed metal oxide, hydroxide, and oxyhydroxide sorbent nanomaterial includes a crystalline structure, an amount of the non-magnetic mixed metal oxide, hydroxide, and oxyhydroxide in crystalline structure being less than that of the amorphous non-crystalline structure.

3. A method according to claim 1 further comprising an amount of the metal in one oxidation state being different than an amount of the metal in another oxidation state.

4. A method according to claim 1 wherein a total sulfur loading capacity of the non-magnetic mixed metal oxide, hydroxide, and oxyhydroxide sorbent nanomaterial is in a range of 40% wgt to 50% wgt.

5. A method according to claim 1 wherein an average particle size of the non-magnetic mixed metal oxide, hydroxide, and oxyhydroxide sorbent nanomaterial is in a range of 10 nm to 50 nm.

6. A method according to claim 1 wherein an average surface area of the non-magnetic mixed metal oxide, hydroxide, and oxyhydroxide sorbent nanomaterial is in a range of 50 $m^2/g$ to 400 $m^2/g$.

7. A method according to claim 1 wherein the non-magnetic mixed metal oxide, hydroxide, and oxyhydroxide sorbent nanomaterial is a mixed iron oxide, hydroxide, and oxyhydroxide sorbent nanomaterial.

8. A method according to claim 7 wherein a ferrous content of the non-magnetic mixed metal oxide, hydroxide, and oxyhydroxide sorbent nanomaterial is greater than a ferric content.

9. A method according to claim 7 wherein a ferric content of the non-magnetic mixed metal oxide, hydroxide, and oxyhydroxide sorbent nanomaterial is greater than a ferrous content.

\* \* \* \* \*